J. DUVALL.
PNEUMATIC FEEDER FOR PRESSES.
APPLICATION FILED APR. 23, 1915.
1,164,585.
Patented Dec. 14, 1915.
4 SHEETS—SHEET 1.
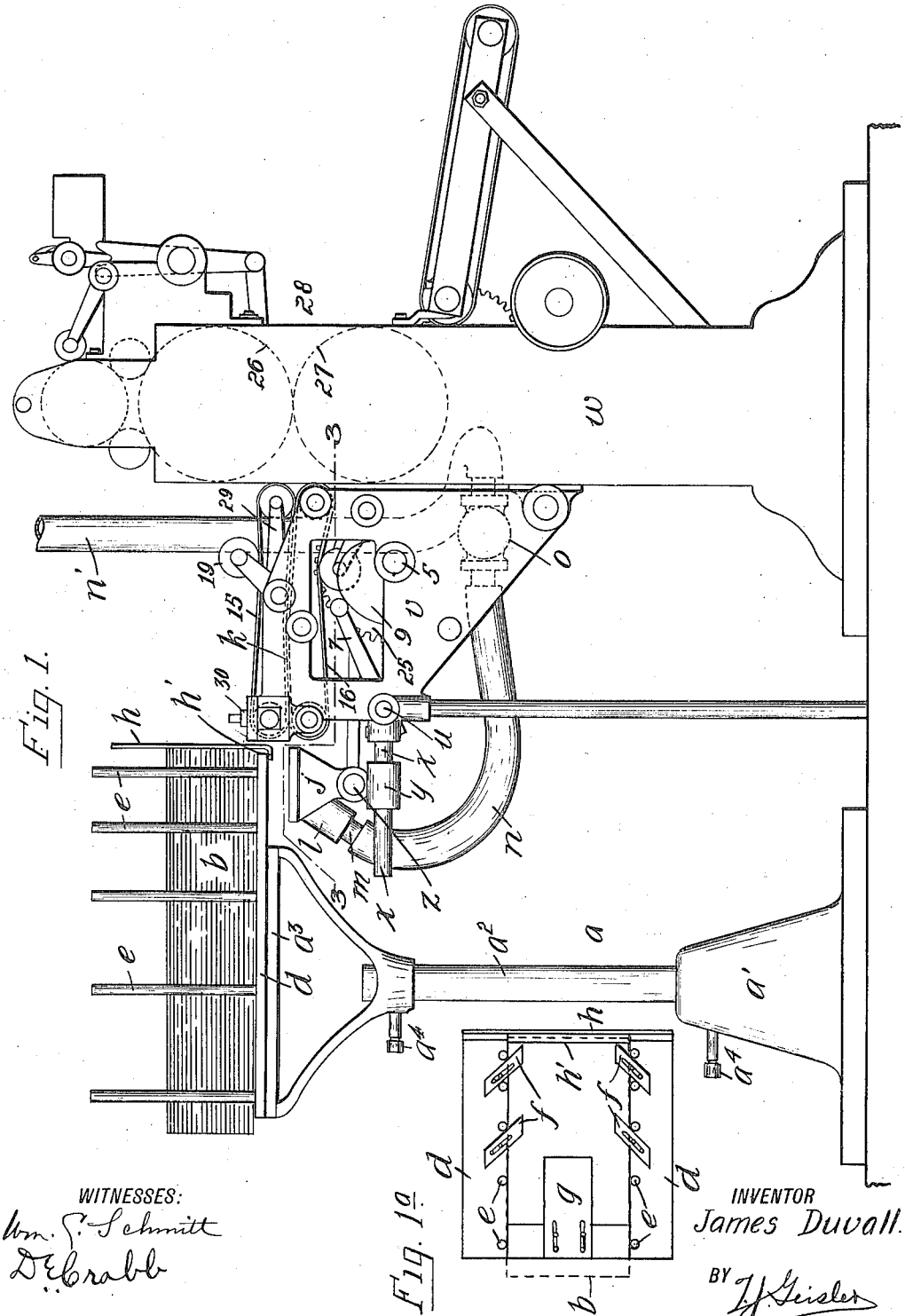
WITNESSES:
INVENTOR
James Duvall.
BY
ATTORNEY

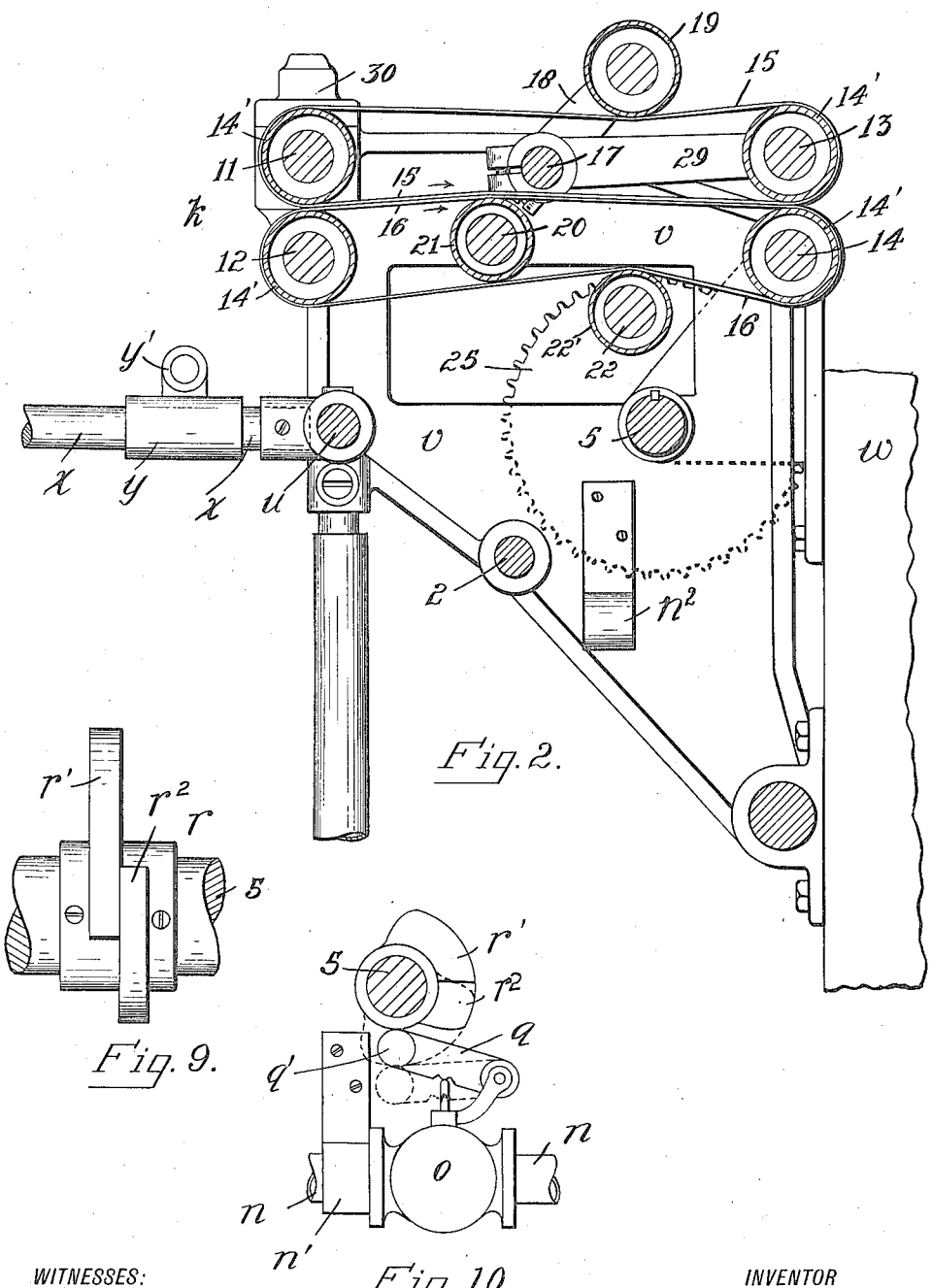

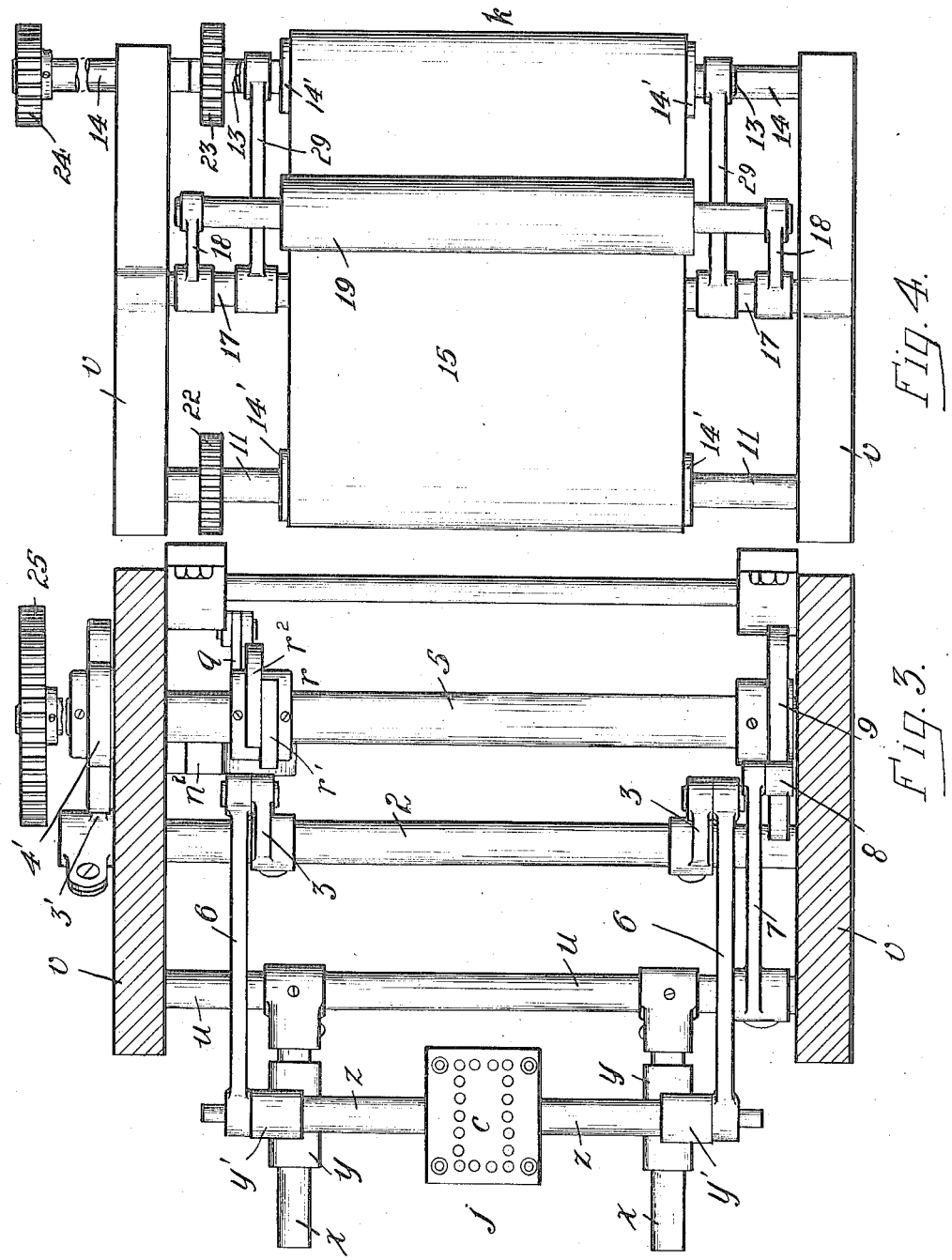

J. DUVALL.
PNEUMATIC FEEDER FOR PRESSES.
APPLICATION FILED APR. 23, 1915.
1,164,585.
Patented Dec. 14, 1915.
4 SHEETS—SHEET 4.
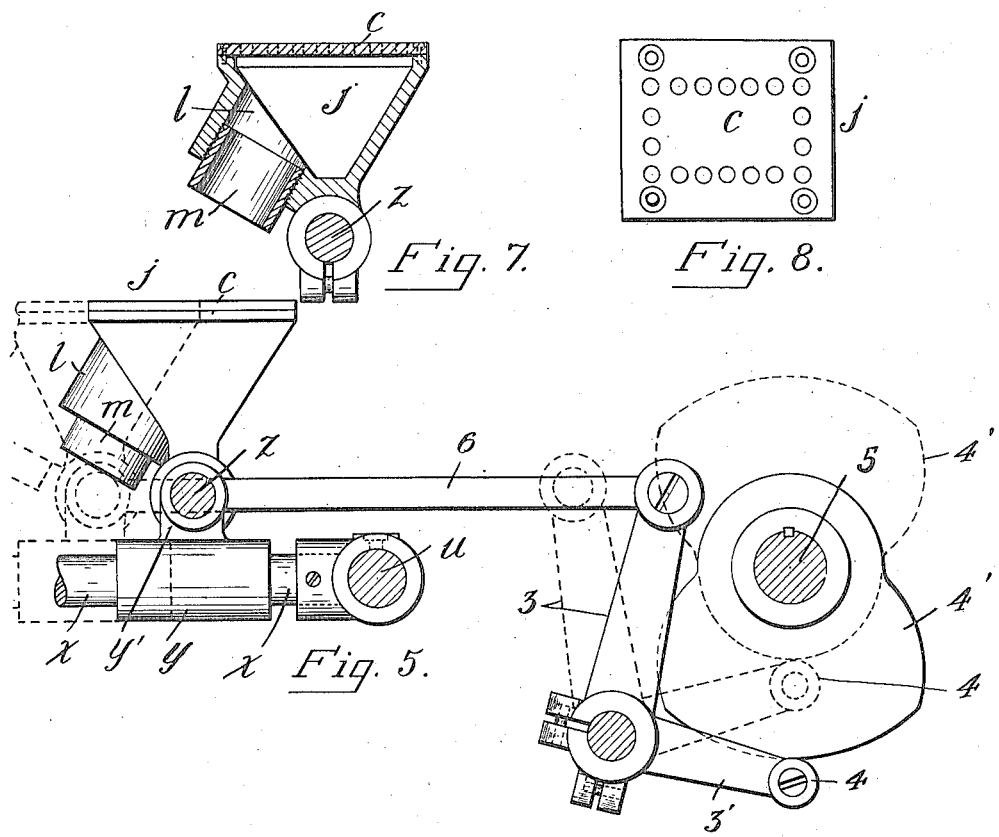
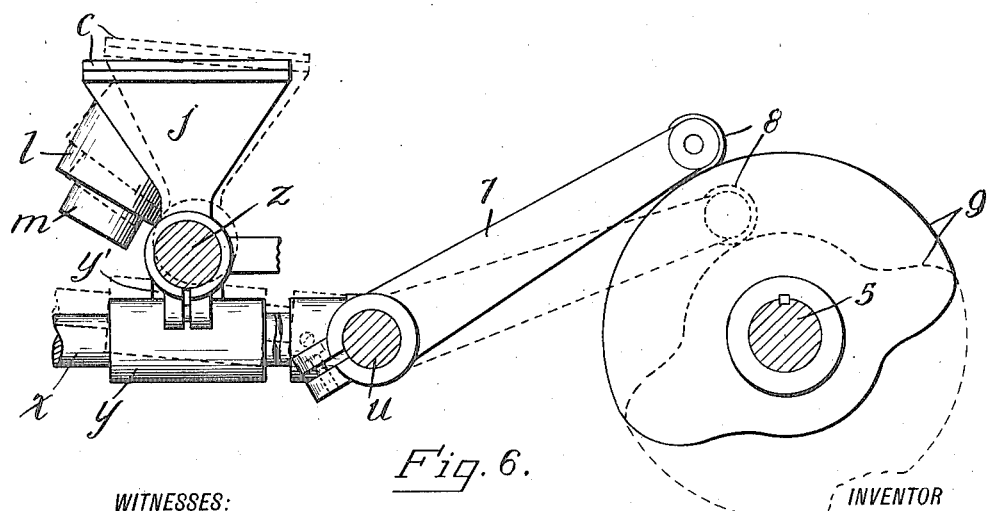
WITNESSES:
INVENTOR
James Duvall,
BY
ATTORNEY

UNITED STATES PATENT OFFICE.

JAMES DUVALL, OF CAMAS, WASHINGTON.

PNEUMATIC FEEDER FOR PRESSES.

1,164,585.  Specification of Letters Patent.  Patented Dec. 14, 1915.

Application filed April 23, 1915. Serial No. 23,527.

*To all whom it may concern:*

Be it known that I, JAMES DUVALL, a citizen of the United States, and a resident of Camas, county of Clarke, and State of Washington, have invented a new and useful Improvement in Pneumatic Feeders for Presses, of which the following is a specification.

My invention has for its general purpose, the providing of suitable means for automatically feeding units of material, in rotation, from a stack to a printing press, or other mechanism provided for performing work on said material. And one of the principal objects of my invention is to embody therein, among others, the following features: The material is arranged in a vertical stack, and the units thereof are removed from the bottom of such stack; no nippers are employed as a part of the feeding means, and the bottom unit of the stack of material is seized by a suction device and thence delivered to a conveyer of a simple but efficient form. Briefly stated, the advantages of these features are: By withdrawing the material from the bottom of the stack, the stack may be continually replenished at the top, and no means are required for maintaining the material in a working plane, which is required where the units of material are removed from the top, or from an end of a horizontal stack. And with regard to the elimination of nippers, it is to be said that where nippers are used, they require constant adjustment, for if they do not grip with a sufficient hold, the material is apt to slip from them, and if they are adjusted too tight they are apt to cut the material. As an efficient and simple conveyer, I employ a device which consists of two endless belts, preferably made of rubber, or some material having a friction surface; the belts running one on the other seize the material between them, and hold it against twisting and turning, thus not requiring any side guides and insuring that the printing will occur at about the same place on the successive units of material.

For the purpose of seizing the bottom unit of the stack of material and delivering it to the conveyer, I employ a suction device of simple construction and efficient operation.

Further details of my invention are more readily understood by having reference to the accompanying drawings, in which—

Figure 1 is a side elevation showing my invention as used in connection with a common type of printing press; Fig. 1$^a$ is a top view of the rack in which the material to be printed is supported in a vertical stack; Fig. 2 is a larger-scaled longitudinal vertical section showing particularly the construction of my improved feeder located between the suction device and the press, for feeding the bags from the former to the latter; Fig. 3 is a horizontal section taken approximately on the line 3—3 of Fig. 1, and shows the general arrangement of the suction device; Fig. 4 is a plan view of Fig. 1, and shows that portion of my device embodying the improved conveyer; Fig. 5 is a sectional detail showing the means for reciprocating the suction device of my feeder mechanism; Fig. 6 is a similar view illustrating the means for tilting said suction device, for the purpose of bringing it closer to the bottom unit of the stack of material; Figs. 7 and 8 are details of the suction device, the former showing a longitudinal section, and the latter a top view of such device; Fig. 9 is an end elevation of the adjustable cam by means of which the suction through the box shown in Fig. 7 is intermittently cut off or on; and Fig. 10 is a detailed view showing the operation of the vacuum creating means in time with the action of my mechanism.

$a$ is a standard including a base $a'$, a vertical, adjustable post $a^2$, and a head $a^3$, mounted on said post. The adjustable parts are secured in position by the set-screws $a^4$. On the head $a^3$ is mounted a rack consisting of plates $d$, $d$, on which are mounted alining posts $e$. On the plates $d$ are further mounted adjustable supporting fingers $f$, and an adjustable plate $g$. At the front of the rack is provided a plate $h$, made with a toe $h'$. The stack of material $b$, is supported on the plate $g$, fingers $f$ and toe $h'$ approximately as indicated by the dotted line in Fig. 1$^a$. As apparent from Fig. 1$^a$, the underside of the lowermost or bottom unit of the stack of material is exposed so that it may be seized by the suction device $j$ and carried from the rack to the conveyer $k$.

The suction device, as more clearly shown in Fig. 7, consists of a hollow head V-shape in cross-section, made with a perforated top plate $c$, a neck $l$, in which is threaded a coupling member $m$, of a flexible pipe $n$, the end $n'$ of which is connected to some suitable source of vacuum creating mechanism, and the flow of the air through the tube $n$ is controlled by a whistle valve $o$, the latter being held rigid in a bracket $n^2$.

The periodic operation of the valve $o$ is diagrammatically shown in Fig. 10. The operating arm $q$, of the valve $o$, carries a cam roll $q'$, which bears on a cam element $r$, the rotation of which periodically opens said valve. The cam element $r$ is made of two members $r'$, $r^2$, relatively adjustable on a cam-shaft 5, and by moving said cam members the valve opening period may be relatively lengthened or shortened. The suction device $j$, has a longitudinally reciprocable motion, (see Fig. 5) and means are also provided for tilting the same at the end of the horizontal movement of the suction device. These movements are accomplished by the following means: A rocker shaft $u$ is transversely journaled in the brackets $v$, secured on the frame $w$, of the printing press. On the shaft $u$ are fixed horizontally extending parallel arm $x$, on which are slidably mounted the sleeves $y$, made with ears $y'$. In such ears is journaled a transverse shaft $z$, and adjustably mounted thereon is the suction device $j$. On a shaft 2, transversely journaled on the brackets $v$ are adjustably mounted crank arms 3, and 3', the latter being provided with a cam roll 4, which rolls on a cam 4', the latter fixed on the cam-shaft 5. See Figs. 3 and 5. The spring which holds the cam roll on the cam is not shown in these views. The crank arms 3 are connected by links 6 to the shaft $z$, on which the suction device $j$ is mounted. On the shaft $u$ is adjustably mounted a crank arm 7, on the extremity of which is a cam roll 8, which bears on a cam 9, the latter fixed on the cam shaft 5, (see Fig. 6) and such crank arm 7 serves to rock the shaft $u$ and thereby the suction device $j$, so as to tilt the same and bring one end of its head in closer proximity to the bottom unit of material stacked in the rack. The restraining spring for holding the cam roll on the cam is omitted in Fig. 6.

The conveyer consists of the shafts 11, 12, 13 and 14, transversely journaled in the brackets $v$, and on such shafts are mounted rollers, as shown by 14', and on such rollers are endless belts 15, 16, running one on the other. The belts are preferably made of rubber or of some material which has a friction surface, and the friction faces of the two belts are opposed to each other. 17 is a shaft rigidly supported by the brackets $v$, and on such shaft is adjustably mounted a pair of arms 18, in the free ends of which is journaled a roller 19, bearing on the upper endless belt, as more clearly shown in Figs. 1 and 2. Within the lower endless belt 16, there is journaled in the brackets $v$ a transverse shaft 20, on which is mounted a roller 21, as shown in Fig. 2, and such roller serves the purpose of holding the upper member of the lower belt in operative contact with the lower member of the upper belt. 22 is a transverse shaft, on which is mounted a roller 22', which serves as a tightening means for the lower belt. The shafts 11 and 12, and the shafts 13 and 14, are geared together by the gears 22 and 23 respectively, as shown in Fig. 4. On the shaft 14 is also affixed a gear 24, meshing with and driven by a gear 25, which is fixed on the cam shaft 5, and the latter is driven directly from the press rolls 26 and 27 by a gear connection not shown in these drawings.

The suction device $j$ is given both a reciprocating and rotary movement. The vacuum in the suction device is controlled in a suitable manner by the valve $o$, so as to cause the suction device $j$ to act upon the bottom unit of the stack of material, and draw such unit from under the stack and deliver the same to the conveyer $k$. When the latter has seized said unit of material, the suction in the device $j$ is cut out and the unit is conveyed between the rollers 26 and 27 of the printing press 28, which is understood to be of one of the well-known types diagrammatically outlined; or in place of such press, there may be used any device for performing work on the unit of material delivered from the conveyer $k$.

The shaft 13 is supported by arms 29, which are fixed on the shaft 17, and the spring in said arms allows a slight separation of the shafts 13 and 14. The shaft 11 is mounted in spring journal boxes 30. In this way, the rollers 11 and 12 and the rollers 13 and 14 are capable of separation when a unit of material enters or leaves the conveyer.

I claim:

1. In feeder mechanism of the character described, in combination with a support adapted for holding vertically stacked units of material and exposing the under side of the bottom unit, and a conveyer, a rotatable shaft and a perpendicular arm thereon, a suction device reciprocable on said arm, relatively timed means for reciprocating said suction device and rotating said shaft, and means for controlling the exhaust in the suction device relatively to its operation.

2. In feeder mechanism of the character described, in combination with a support adapted for holding vertically stacked units of material and exposing the under side of the bottom unit, and a conveyer, a rotatable shaft and a perpendicular arm thereon, a suction device reciprocable on said arm, relatively timed adjustable means for reciprocating said suction device and rotating said shaft, and means for controlling the exhaust in the suction device relatively to its operation.

3. In feeder mechanism of the character described, in combination with a support adapted for holding vertically stacked units of material and exposing the under side of the bottom unit, and a conveyer, a rotatable shaft and a perpendicular arm thereon, a suction device reciprocable on said arm, a cam-element operating to reciprocate said suction device, another cam-element operating to rotate said rotatable shaft relative to said reciprocation, and means for controlling the exhaust in the suction device relatively to its operation.

4. In feeder mechanism of the character described, in combination with a support adapted for holding vertically stacked units of material and exposing the under side of the bottom unit, and a conveyer, a rotatable shaft and a perpendicular arm thereon, a suction device reciprocable on said arm, a cam-element operating to reciprocate said suction device, another cam-element operating to rotate said rotatable shaft relative to said reciprocation, one or both of said cam elements being adjustable to vary the action controlled thereby.

5. In feeder mechanism of the character described, in combination with a support adapted for holding vertically stacked units of material and exposing the under side of the bottom unit, and a conveyer, a rotatable shaft, a perpendicular supporting member thereon, a member slidable on said supporting member, a suction device carried by the slidable member, a cam-element operating to rotate the rotatable shaft, a rock-shaft, a crank-arm thereon, a cam rocking said crank-arm, a link connecting the crank arm with the suction device, and means for controlling the exhaust in the suction device relatively to its operation.

6. In feeder mechanism of the character described, in combination with a support adapted for holding vertically stacked units of material and exposing the under side of the bottom unit, and a conveyer, a rotatable shaft, a perpendicular supporting member thereon, a member slidable on said supporting member, a suction device carried by the slidable member, an adjustable cam-element operating to rotate the rotatable shaft, a rock-shaft, an adjustable crank arm thereon, a cam rocking said crank-arm, a link connecting the crank arm with the suction device, and means for controlling the exhaust in the suction device relatively to its operation.

JAMES DUVALL.

Witnesses:
  WM. C. SCHMITT,
  D. E. CRABB.